United States Patent
Fuehrer et al.

(10) Patent No.: US 9,806,459 B2
(45) Date of Patent: Oct. 31, 2017

(54) PLUG CONNECTOR PART WITH A LATCHING ELEMENT

(71) Applicant: PHOENIX CONTACT E-MOBILITY GMBH, Schieder-Schwalenberg (DE)

(72) Inventors: Thomas Fuehrer, Blomberg (DE); Robert Babezki, Steinheim (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/117,471

(22) PCT Filed: Feb. 10, 2015

(86) PCT No.: PCT/EP2015/052670
§ 371 (c)(1),
(2) Date: Aug. 9, 2016

(87) PCT Pub. No.: WO2015/121208
PCT Pub. Date: Aug. 20, 2015

(65) Prior Publication Data
US 2016/0359264 A1    Dec. 8, 2016

(30) Foreign Application Priority Data
Feb. 17, 2014  (DE) .......................... 10 2014 101 952

(51) Int. Cl.
*H01R 11/30*  (2006.01)
*H01R 13/627*  (2006.01)
(Continued)

(52) U.S. Cl.
CPC ...... *H01R 13/6275* (2013.01); *B60L 11/1818* (2013.01); *H01R 13/6205* (2013.01);
(Continued)

(58) Field of Classification Search
CPC . H01R 13/6205; H01R 13/6272; H01R 11/30
(Continued)

(56) References Cited

U.S. PATENT DOCUMENTS 3,569,908 A * 3/1971 Appleton ............. H01R 13/707
335/170
4,828,510 A * 5/1989 Muzslay ............. H01R 13/627
439/159
(Continued)

FOREIGN PATENT DOCUMENTS

DE         19649707 C2    6/1997
DE         69708827 T2    6/2002
(Continued)

*Primary Examiner* — Gary Paumen
(74) *Attorney, Agent, or Firm* — Leydig, Voit & Mayer, Ltd.

(57) ABSTRACT

A plug connector part fix a plug connector includes a housing part; a plug portion which is arranged on the housing part for plug-in connection to another plug connector part; a latching element which is arranged in a movable manner on the housing part and has a latching portion that locks to the other plug connector part, the latching element being movable between a first, locking position for establishing locking between the plug connector part and the other plug connector part and a second, unlocking, position for unlocking the plug connector part from the other plug connector part; and a fixing device to fix the latching element in the first, locking position. The fixing device releases a fixing provided by the fixing device in the first, locking position by applying a force to the latching element that is greater than a predetermined fixing force.

18 Claims, 5 Drawing Sheets

(51) Int. Cl.
*B60L 11/18* (2006.01)
*H01R 13/62* (2006.01)
*H01R 13/635* (2006.01)

(52) U.S. Cl.
CPC ......... *H01R 13/635* (2013.01); *Y02T 10/7005* (2013.01); *Y02T 10/7072* (2013.01); *Y02T 90/14* (2013.01)

(58) Field of Classification Search
USPC ............................................. 439/39, 352, 38
See application file for complete search history.

(56) References Cited

U.S. PATENT DOCUMENTS

| | | | | |
|---|---|---|---|---|
| 5,350,312 | A * | 9/1994 | Kuno | B60L 11/1818 439/310 |
| 5,477,418 | A * | 12/1995 | MacGregor | H05K 5/0273 361/737 |
| 5,751,135 | A | 5/1998 | Fukushima et al. | |
| 5,800,196 | A * | 9/1998 | Rudoy | H01R 23/27 439/284 |
| 5,873,737 | A * | 2/1999 | Hashizawa | B60L 11/1818 439/310 |
| 5,888,081 | A | 3/1999 | Konoya et al. | |
| 6,264,485 | B1 | 7/2001 | Saka et al. | |
| 6,364,705 | B1 * | 4/2002 | Yamamoto | H01R 13/4223 439/595 |
| 6,475,016 | B1 * | 11/2002 | Heidenreich | G11B 33/124 439/157 |
| 7,044,780 | B2 * | 5/2006 | Ma | H01R 13/639 439/553 |
| 7,131,854 | B1 * | 11/2006 | Pavlovic | H01R 13/6273 439/352 |
| 8,206,171 | B2 | 6/2012 | Osawa et al. | |
| 8,573,994 | B2 | 11/2013 | Kiko et al. | |
| 9,531,127 | B2 * | 12/2016 | Yahagi | B60L 11/1818 |
| 2002/0137376 | A1 * | 9/2002 | Miyamoto | H01R 13/62933 439/142 |
| 2004/0018764 | A1 * | 1/2004 | Thurston | H01R 13/623 439/312 |
| 2005/0090133 | A1 * | 4/2005 | Ma | H01R 13/639 439/131 |
| 2006/0019541 | A1 * | 1/2006 | Maguire | B60L 3/0069 439/620.34 |
| 2011/0009003 | A1 * | 1/2011 | Youssefi-Shams | H01R 13/44 439/628 |
| 2011/0070776 | A1 * | 3/2011 | Matsunaga | G06K 7/0021 439/629 |
| 2014/0106586 | A1 | 4/2014 | Boeck et al. | |

FOREIGN PATENT DOCUMENTS

| | | |
|---|---|---|
| DE | 60026798 T2 | 9/2006 |
| DE | 102011002024 A1 | 10/2012 |
| JP | 2011165609 A | 8/2011 |
| WO | WO 2013035240 A | 8/2011 |

* cited by examiner

PLUG CONNECTOR PART WITH A LATCHING ELEMENT

CROSS-REFERENCE TO PRIOR APPLICATIONS

This application is a U.S. National Phase application under 35 U.S.C. §371 of International Application No. PCT/EP2015/052670, filed on Feb. 10, 2015, and claims benefit to German Patent Application No. DE 10 2014 101 952.0, filed on Feb. 17, 2014. The International Application was published in German on Aug. 20, 2015 as WO 2015/121208 A1 under PCT Article 21(2).

FIELD

The invention relates to a plug connector part for a plug connector.

BACKGROUND

Such a plug connector part comprises a housing part, a plug portion which is arranged on the housing part and intended for plug-in connection to another plug connector part, and a latching element which is arranged in a movable manner on the housing part and has a latching portion for locking to the other plug connector part. The latching element can be moved between a first, locking position for establishing locking between the plug connector part and the other plug connector part, and a second, unlocking position for unlocking the plug connector part from the other plug connector part.

Such a plug connector part in the form of a charging plug is known from DE 196 49 707 C2 for example. The charging plug comprises a latching element in the form of a locking lever which is designed to lock the charging plug to the charging socket in the case of a charging plug that is put into a charging socket. To release the locking between the charging plug and the charging socket, the locking lever can be pivoted in order to disengage a latching portion of the locking lever from an associated latch receiver of the charging socket in this manner such that the charging plug can be pulled out of the charging socket.

Other charging plugs comprising a latching element in the form of a latching lever are known for example from DE 10 2011 002 024 A1, U.S. Pat. No. 8,206,171 B2, U.S. Pat. No. 8,573,994 B2 and WO 2013/035 240 A1.

By providing such a latching element, for example in the case of a plug connector part in the form of a charging plug, reliable locking of the plug connector parts can be achieved in the case of a plug connector part plugged into another plug connector part, for example a charging socket, such that the plug connector part cannot readily be removed from the other plug connector part, or at least not without releasing the locking.

In this case, in conventional plug connector parts, the latching element in the form of the latching lever is normally pre-loaded by means of a pre-tensioned spring toward the first, locking position such that the latching element has to be moved against the spring pressure of the pre-tensioned spring in order to release the locking. Because the spring force to be overcome in order to operate the latching element can be large, it is possible in this case that, in the event of manual operation of the latching element by a user, the user attempts to remove the plug connector part from the other plug connector part before the locking provided by the latching element has been completely released, for example when the latching portion of the latching element is at least partially still located in an associated latching receiver of the other plug connector part. If the user pulls at the plug connector part in order to release the plug connector part from the other plug connector part, this can lead to a force action onto the latching portion of the latching element, which might possibly bring about damage to or even the destruction of the latching portion on the latching element.

There is therefore a need for a latching mechanism in the case of a plug connector part, which on the one hand produces reliable locking between the plug connector parts in the first, locking position but on the other hand can be moved safely and reliably out of the first, locking position into the second, unlocking position such that it can be ensured that the locking is also released when releasing the plug connector parts from one another.

SUMMARY

A plug connector part for a plug connector includes a housing part; a plug portion which is arranged on the housing part for plug-in connection to another plug connector part; a latching element which is arranged in a movable manner on the housing part and has a latching portion that locks to the other plug connector part, the latching element being movable between a first, locking position for establishing locking between the plug connector part and the other plug connector part and a second, unlocking position for unlocking the plug connector part from the other plug connector part; and a fixing device to fix the latching element in the first, locking position. The fixing device is configured to release a fixing provided by the fixing device in the first, locking position by an applying of a force to the latching element that is greater than a predetermined fixing force. The latching element is movable in an operating direction toward the second, unlocking position after the fixing is released by an applying of a movement force that is less than the predetermined fixing force.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, a fixing device is provided, which is designed to fix the latching element in the first, locking position, it being possible for the fixing, which is provided by the fixing device, in the first, locking position, to be released by applying a force to the latching element which is greater than a predetermined fixing force, and for the latching element to be moved in an operating direction toward the second, unlocking position after the fixing is released by applying a movement force which is less than the predetermined moving force.

The fixing device serves to fix the latching element in the first, locking position. For this purpose, the fixing device provides a fixing force, which keeps the latching element in the first, locking position and has to be overcome in order to move the latching element out of the first, locking position toward the second, unlocking position. Once the fixing force has been overcome, the latching element can subsequently be moved further toward the second, unlocking position by applying a smaller movement force. This has the consequence that, in the event of manual operation, the latching element is pushed through to the second, unlocking position immediately after overcoming the fixing force since the fixing force initially to be overcome by a user exceeds the force required for the further movement of the latching element and, when a force is applied which exceeds the fixing force, the latching element is then also readily moved into the second, unlocking position.

In this manner, intermediate positions upon opening the latching element, i.e. during the movement of the latching element out of the first, locking position into the second, unlocking position, are reliably prevented. This is because after overcoming the fixing force, the latching element is readily moved fully into the second, unlocking position because the forces required to move the latching element after overcoming the fixing force are lower than the fixing force.

In particular, the fixing device can be dimensioned such that after releasing the fixing device, the force required to move the latching element is considerably lower than the fixing force provided by the fixing device. If, for example, the fixing device comprises magnetically acting elements, in other words for example, two magnets which are located opposite one another in a magnetically attracting manner in the first, locking position, and if the magnetic elements are remote from one another so as to release the latching element out of the first, locking position, the magnetic attraction forces suddenly decrease upon enlargement of the gap between the magnetic elements, which has the effect that the further movement of the latching element can take place by applying considerably smaller forces.

If intermediate positions are prevented in this manner upon operation of the latching element for moving out of the first, locking position into the second, unlocking position, it is ensured that upon release of the locking between the plug connector parts, the situation does not arise in which the latching portion of the latching element is at least partially still engaged in a locking manner in an associated latching receiver of the other plug connector part if a user attempts to release the plug connector parts from one another. In this manner, abrasion on the latching element upon release of the connection between the plug connector parts can be prevented in a reliable manner. In particular, the risk of damage to or even the destruction of the latching element or the latching portion arranged thereon is prevented.

The latching element is preferably designed as a latching lever, which is mounted pivotally on the housing part. For example, the latching element can be mounted pivotally on the housing part by means of a bearing element, the latching element in the form of the latching lever having a first lever arm, which supports the latching portion and a second lever arm, which lever arms extend from the bearing element in different directions. The fixing device can, for example, be arranged on the second lever arm, such that the latching element is fixed in its first, locking position by means of the second lever arm.

An operating portion, by means of which a user can manually act on the latching element in order to operate the latching element, can, for example, also be provided on the second lever arm. By acting on the operating portion, a user can therefore move the second lever arm and as a result of this, also pivot the first lever arm such that the latching portion of the latching element that is arranged on the first lever arm can be raised out of an associated latching receiver of the other plug connector part in order to release the locking between the plug connector parts.

Preferably, the latching element is pre-loaded toward its first, locking position, it being possible to provide a spring element, for example, for this purpose, which operates between the latching element and the housing part. The spring element can, for example, be designed as a compression spring, which preloads the latching element toward the first, locking position.

When operating the latching element to move out of the first, locking position into the second, unlocking position, a user must in this case move the latching element against the spring pressure of the spring element. In this respect, the spring element is, however, dimensioned such that the spring force to be overcome by the user is (considerably) lower than the fixing force to be overcome at the beginning such that, upon operation of the latching element by an operating force which is greater than the fixing force, the latching element is readily moved fully into the second, unlocking position by overcoming the spring force.

If a user subsequently lets go of the latching element and if they do not apply any operating force to the latching element (any more), the latching element moves under the effect of the pre-tensioned spring element automatically back into its first, locking position such that upon (renewed) connection of the plug connector part to another plug connector part, the locking between the plug connector parts can advantageously be established automatically.

Preferably, the fixing device comprises a first fixing element, which is arranged on the housing part, and a second fixing element, which is arranged on the latching element, which interact with one another in the first, locking position of the latching element in order to provide the predetermined fixing force. The fixing elements can, for example, be formed by magnetically acting elements, in other words, for example, two magnets or one magnet and a magnetic keeper in the form of a component made of a material having ferromagnetic properties, and preferably be located against one another, in a magnetically attracting manner, in the first, locking position or are located at least at a small distance from one another in a magnetically attracting manner. Upon operation of the latching element for moving the latching element out of the first, locking position into the second, unlocking position, the fixing elements in the form of the magnetically acting elements are moved away from one another, which has the consequence that the magnetic attraction forces acting between the elements reduce as the distance increases and the latching element can therefore be moved further toward the second, unlocking position with considerably less force.

The first fixing element in the form of a first magnetically acting element (for example a magnet or a magnetic keeper) is preferably arranged in a receiving chamber of a wall of the housing part. In this respect, the receiving chamber surrounds the fixing element at least in portions, the receiving chamber being bordered by an edge portion, against which the first fixing element is positioned, toward a side of the wall of the housing part which faces the latching element. The first fixing element is therefore held in a form-fitting manner on the housing part and in particular, cannot be moved past the edge portion toward the latching element. Because the fixing element is positioned against the edge portion, a form fit is established in a direction parallel to the operating direction between the fixing element and the housing part, which results in the fixing element being reliably held on the housing part in a mechanical manner.

Similarly, the second fixing element can also be arranged in a receiving chamber of the latching element, the receiving chamber being bordered by an edge portion, against which the second fixing element is positioned, toward a side of the latching element which faces the wall of the housing part that supports the first fixing element. The second fixing element is therefore held in a form fit on the latching element similarly to the first fixing element on the housing part such that the second fixing element cannot be moved past the edge portion of the latching element that borders the receiving chamber toward the housing part.

As a result of the fixing elements being held in a form-fitting manner on the wall of the housing part and on the latching element, respectively, a more secure, durable hold on the associated component is ensured.

Alternatively, it is, however, possible to stick, screw or fasten in a different manner each of the fixing elements to the associated component thereof. A form-fitting hold does not necessarily have to be provided.

Advantageously, the edge portion on the wall of the housing part or on the latching element extensively surrounds an opening, which opens the receiving chamber toward the other component in each case. As a result of an opening in the wall of the housing part, the receiving chamber, which holds the first fixing element on the housing part, for example, is opened toward the latching element. As a result of an opening in the latching element, on the other hand, the receiving chamber, which holds the second fixing element on the latching element, is opened toward the wall of the housing part. When viewed in a direction transverse to the operating direction, the opening has a smaller width than the associated receiving chamber in each case, in order to establish the form fit between the edge portion and the fixing element arranged in the receiving chamber in this manner.

In an advantageous embodiment, a third fixing element in the form of a magnet or magnetic keeper can be arranged on the first fixing element or on the second fixing element. This third fixing element is inserted in the opening in the wall of the housing part or of the latching element, which is surrounded by the edge portion, and operates in the first, locking position between the first fixing element and the second fixing element. As a result of this third fixing element, it is ensured that, in the first, locking position, a large magnetic attraction force acts between the fixing elements, the third fixing element coming to rest between the first fixing element on the housing part and the second fixing element on the latching element and thus establishing a magnetic flux line between the fixing elements.

The fixing elements can, for example, be designed as disk-shaped, cylindrical or rectangular (square) magnets. Because one fixing element (out of the first fixing element and the second fixing element) is designed so as to be larger than the other fixing element, it can be achieved that the third fixing element always rests on the larger of the fixing elements and remains adhered thereto and in particular, after the release of the fixing device, in other words after the separation of the fixing elements from one another, is moved together with the larger of the fixing elements.

It is, of course, also feasible and possible for the third fixing element to be fastened to the first or second fixing element, for example stuck or screwed to the first or second fixing element, in order to fasten the third fixing element to the associated fixing element in this manner.

If applicable, the third fixing element can also be formed integrally with the first or second fixing element such that a graduated magnet or magnetic keeper emerges, a portion of which comes to rest in the associated receiving chamber and another portion of which projects through the opening toward the other component.

Figure 1:
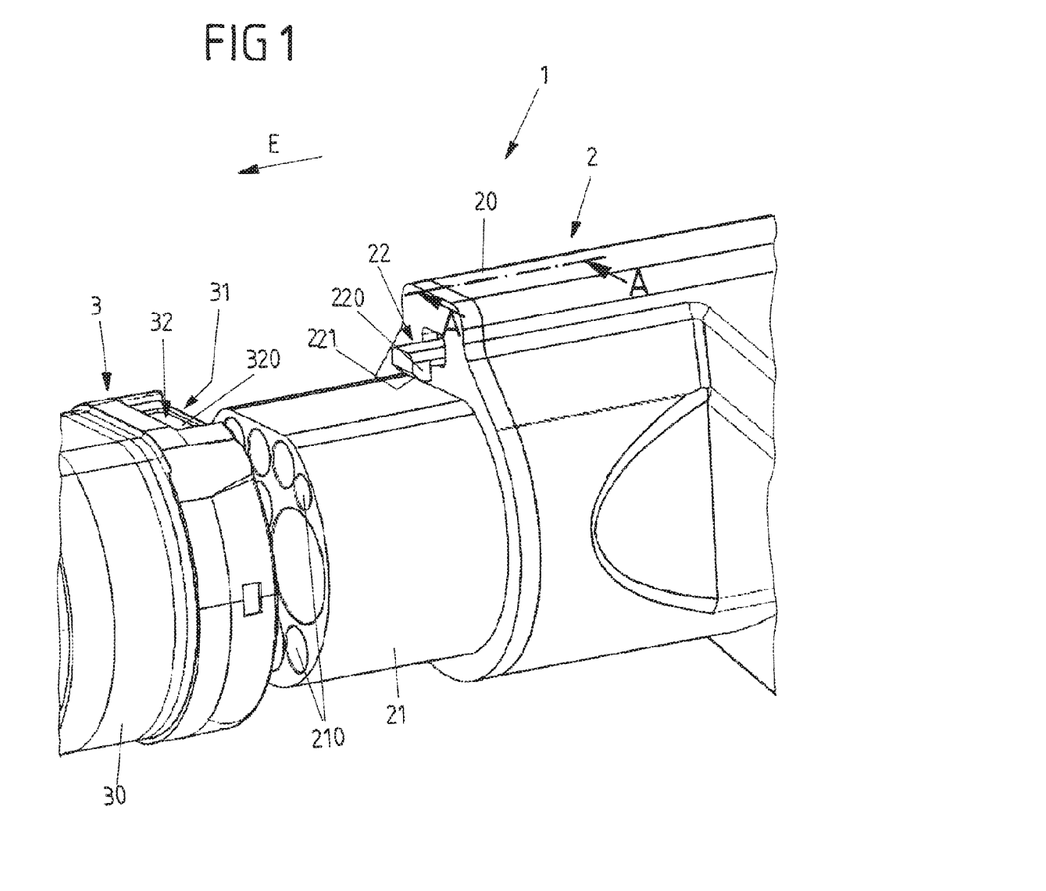
FIG. 1 is a perspective view of a plug connector comprising two plug connector parts in the form of a charging plug and a charging socket, which can be connected to one another by means of a plug-in connection.

FIG. 1 is a perspective view of a plug connector 1, which comprises a first plug connector part 2 in the form of a charging plug and a second plug connector part 3 in the form of a charging socket associated with the charging plug.

The plug connector 1 can, for example, be used on an electric vehicle for electrically charging the vehicle. For this purpose, contact openings 210 having electric contacts arranged therein are provided on a plug portion 21 of the first plug connector part 2, which is to be inserted into a plug receiver 31 of the second plug connector part 3 in order to connect the plug connector parts 2, 3. The electric contacts engage, in an electrically contacting manner, with associated electric contacts in the plug receiver 31 of the second plug connector part 3 when the first plug connector part 2 is inserted into the second plug connector part 3 such that charging currents for charging the vehicle can flow via the plug connector 1.

The first plug connector part 2 comprises a housing part 20, which constitutes a housing of the first plug connector part 2 and to which the plug portion 21 connects. The second plug connector part 3 comprises a housing 30, which extensively surrounds the plug receiver 31. To connect the plug connector parts 2, 3, the plug portion 21 can be inserted into the plug receiver 31 in a substantially form-fitting manner such that, in the inserted state, the plug connector parts 2, 3 are connected to one another by means of a plug-in connection.

A latching element 22 in the form of a latching lever, which is pivotally mounted on the housing part 20, is arranged on the first plug connector part 2 and supports a latching portion 220 on an end facing the second plug connector part 3 upon insertion. A bevel 221 is provided on the latching portion 220, which, as shown in an enlarged view in FIG. 2, moves onto a front edge portion 321 of a latching receiver 32, which forms a recess 320, on the housing 30 of the second plug connector part 3 when the first plug connector part 2 is plugged into the second plug connector part 3 and thus raises the latching element 22 by the latching portion 220 arranged therein such that the latching portion 220 can skim over the edge portion 321 and descend into the recess 320 in a latching manner.

Figure 2:
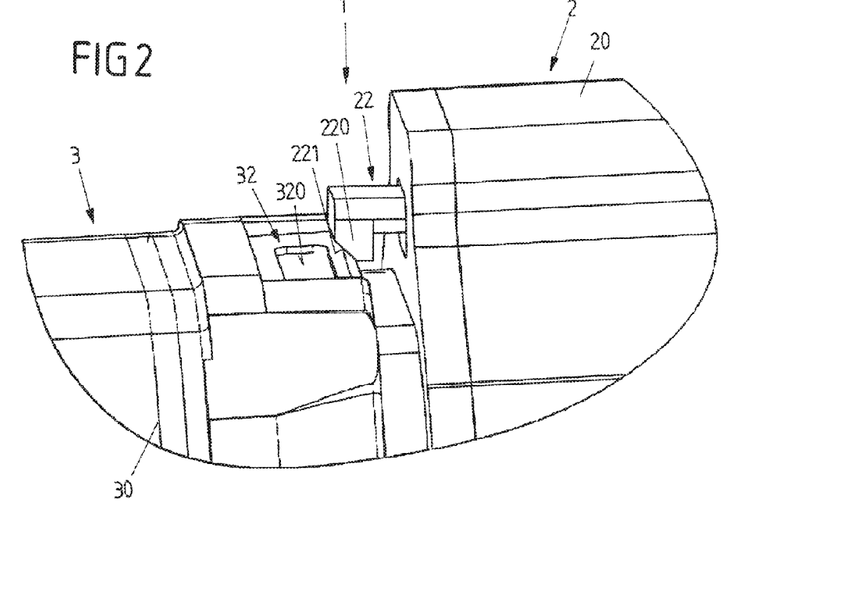
FIG. 2 is a view of a plug connector, which is enlarged in sections, according to FIG. 1 in a position before establishing a locking between the plug connector parts.

When the plug portion 21 is fully inserted into the plug receiver 31, the latching portion 220 is then inserted in the latching receiver 32 of the second plug connector part 3 in a locking manner such that the first plug connector part 2 is locked to the second plug connector part 3 counter to an insertion direction E in which the first plug connector part 2 is to be inserted into the second plug connector part 3.

Figure 3:
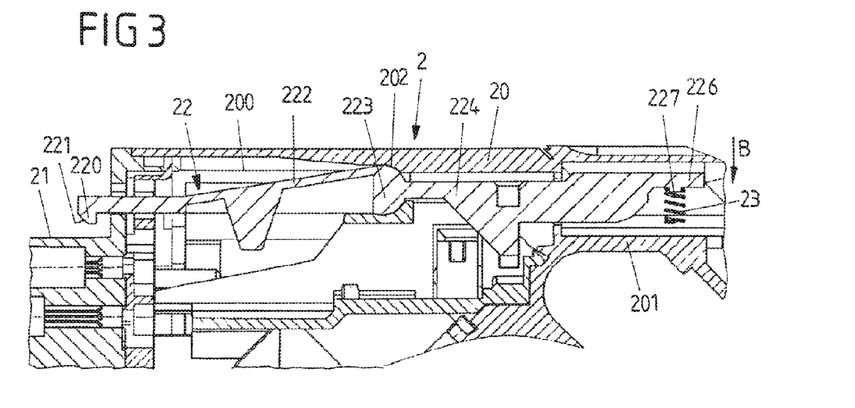
FIG. 3 is a sectional view along the line A-A according to FIG. 1.

FIG. 3 is a longitudinal section along the line A-A according to FIG. 1 showing the pivotable arrangement of the latching element 22 in the housing part 20 of the first plug connector part 1. The latching element 22 in the form of the latching lever comprises a bearing element 223 which is spherical at least in portions and is inserted in a bearing receiver 202 of the housing part 20 such that the latching element 22 can be pivoted relative to the housing part 20 at least over a certain pivoting range.

A first lever arm 222, which supports the latching portion 220 on its end facing away from the bearing element 223, connects to the bearing element 223. In the opposite direction, a second lever arm 224 extends from the bearing element 223 and supports an operating portion 226 on its end facing away from the bearing element 223, by means of which operating portion a user can manually act on the latching element 22 in order to operate the latching element 22 to unlock the plug connector parts 2, 3 from one another.

The force of a spring element 23 is also applied in the region of this end of the second lever arm 224, by means of which spring element the latching element 22 is pre-tensioned under pressure against a wall 201 of the housing part 20. In the process, the spring element 23 acts counter to an operating direction B, in which a user has to operate the latching element 22 in order to move the latching element 22 out of a first, locking position, in which the first plug connector part 2 is locked to the second plug connector part 3 when the plug connector parts 2, 3 are plugged into one another, into a second, unlocking position, in which the locking is released.

The spring pre-tensioning causes the locking between the plug connector parts 2, 3 to be established automatically when the plug connector part 2 is plugged into the second plug connector part 3. The latching portion 220 therefore automatically snaps into the associated latching receiver 32 when the first plug connector part 2 is plugged into the second plug connector part 3.

The spring pre-tensioning ensures that, after successful operation, the latching element 22 is returned automatically to its first, locking position such that the first plug connector part 2 can again be locked to the second plug connector part 3.

Figure 4A:
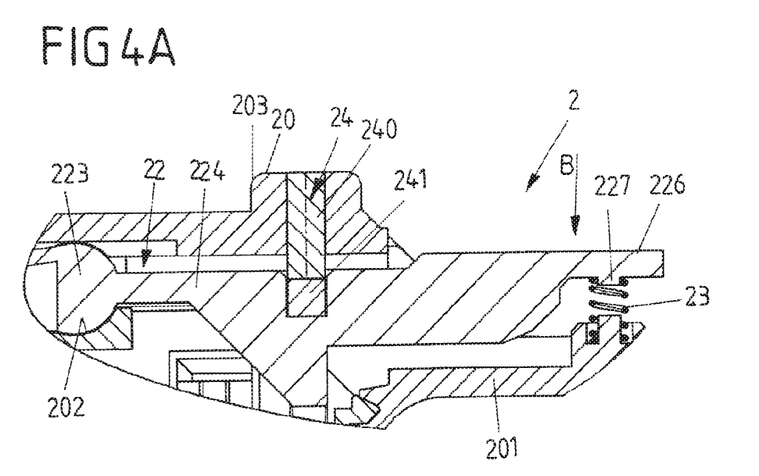
FIG. 4A is a view of a fixing device, which acts to fix a latching element in a first, locking position between the latching element and a housing part of the plug connector part.
Figure 4B:
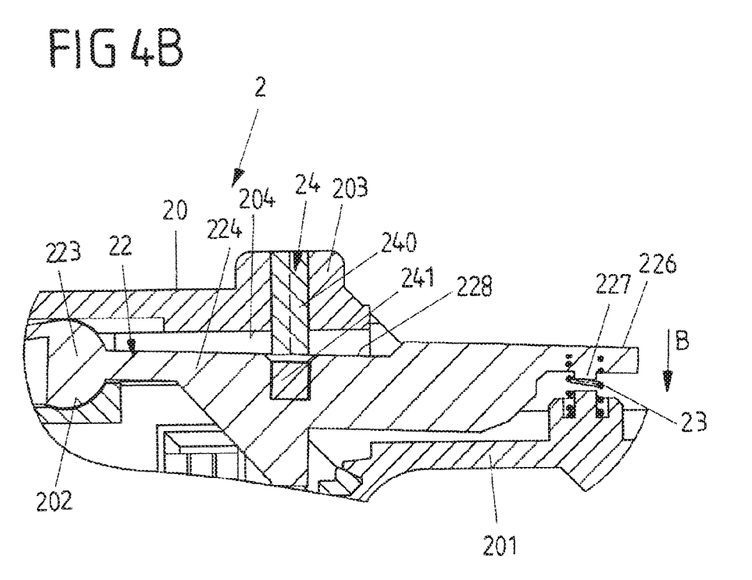
FIG. 4B is the view according to FIG. 4A but in a second, unlocking position of the latching element.

In order to ensure that upon operation of the latching element 22 to unlock the locking between the plug connector parts 2, 3 to release the plug connector parts 2, 3 from one another, the latching element 22 cannot assume any intermediate positions between the first, locking position and the second, unlocking position, a fixing device 24 is provided—as shown in FIGS. 4A and 4B—which acts between the latching element 22 and an external wall 203 of the housing part 20 and provides a fixing of the latching element 22 in the first, locking position.

The fixing device 24 comprises two fixing elements 240 and 241, of which a first fixing element 240 is arranged on the wall 203 of the housing part 20 and a second fixing element 241 is arranged on the second lever arm 224 of the latching element 22. The fixing elements 240, 241 are each designed as magnetically acting elements and face one another in a magnetically attracting manner. For example, the first fixing element 240 can be designed as a magnet, for example as a neodymium magnet, while the second fixing element 241 is formed as a magnet or as a magnetic keeper, in other words as a component made of a ferromagnetic material. If both fixing elements 240, 241 are designed as magnets, they have opposite poles to one another such that they magnetically attract one another.

In the first, locking position of the latching element 22, shown in FIG. 4A, the fixing elements 240, 241 are positioned next to one another such that the magnetic attraction force between the fixing elements 240, 241 is at the maximum. In order to release the latching element 22 out of the first, locking position, a user can press on the operating portion 226 on the first lever arm 224 in the operation direction B in order to pivot the latching element 22 in this manner.

If, in the process, the user applies a force to the operation portion 226, which exceeds a fixing force provided by the magnetic attraction between the fixing elements 240, 241 then the fixing elements 240, 241 are released from one another and moved away from one another, which has the consequence of the magnetic attraction force, which acts between the fixing elements 240, 241, suddenly decreasing. The force required for the further movement of the latching element 22 is much less than the force required to release the latching element 22 out of the first, locking position such that the latching element 22 is readily moved fully to the second, unlocking position, shown in FIG. 4B, upon operation by a user.

The spring 23 providing the spring pre-tensioning is dimensioned in this respect such that the pre-tensioning spring force is less than the fixing force provided by the fixing device 24 in the first, locking position such that after the release of the fixing elements 240, 241 from one another, the movement of the latching element 22 to the second, unlocking position can take place with low application of force.

By providing the fixing device 24, it is ensured that during intended use and operation, no intermediate positions can be assumed during operation of the latching element 22 for releasing the locking. In this way it is ensured that after releasing the locking, the first plug connector part 2 can safely be removed from the second plug connector part 3 and, in the process, the latching portion 220 of the latching element no longer descends into the latching receiver 32 of the second plug connector part 3. In this way, damage to the latching element 22 and to the latching portion 220 arranged thereon can reliably be ruled out when the plug connector parts 2, 3 are being released from one another.

The fixing device 24 is advantageously designed as a magnetically acting device having two magnetic fixing elements 240, 241, at least one of the fixing elements 240, 241 being formed by a (permanent) magnet. The other fixing element 241, 240 is either likewise designed as a (permanent) magnet or as a magnetic keeper.

It is, however, feasible for the fixing device 24 alternatively to provide fixing of the latching element 22 in the first, locking position in other, for example mechanical, ways. For example, the fixing device 24 can also be designed as a catch spring or as a mechanically operating latching device or similar. In this connection, it is only essential for the fixing device 24 to provide a fixing force in the first, locking position of the latching element 22, which has to be overcome to move the latching element 22 out of the first, locking position and which thereupon decreases comparatively quickly upon further movement of the latching element 22.

In the case of the embodiment shown, the first fixing element 240, in the form of a magnetically acting element, is arranged on the wall 203 of the housing part 20 while the second fixing element 241, likewise in the form of a magnetically acting element, is fastened to the second lever arm 124 of the latching element 22. In this respect, various ways of fastening each of the fixing elements 240, 241 to the associated component thereof are possible in principle. For example, each of the fixing elements 240, 241 can be stuck or screwed to the associated component thereof or held on the associated component in another way.

Figure 5:
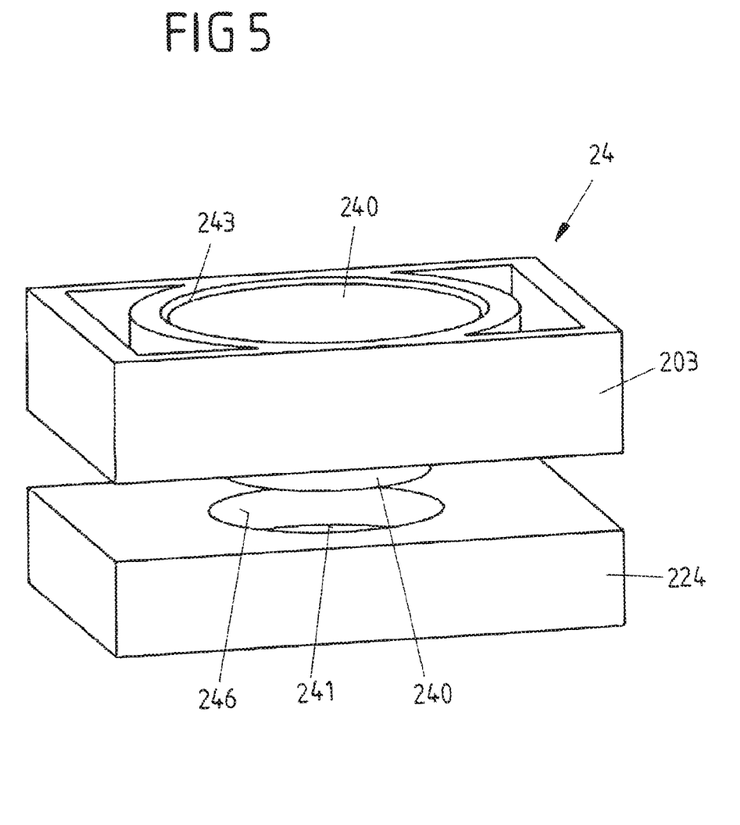
FIG. 5 is a schematic view of a fixing device having magnetically acting elements.
Figure 6A:
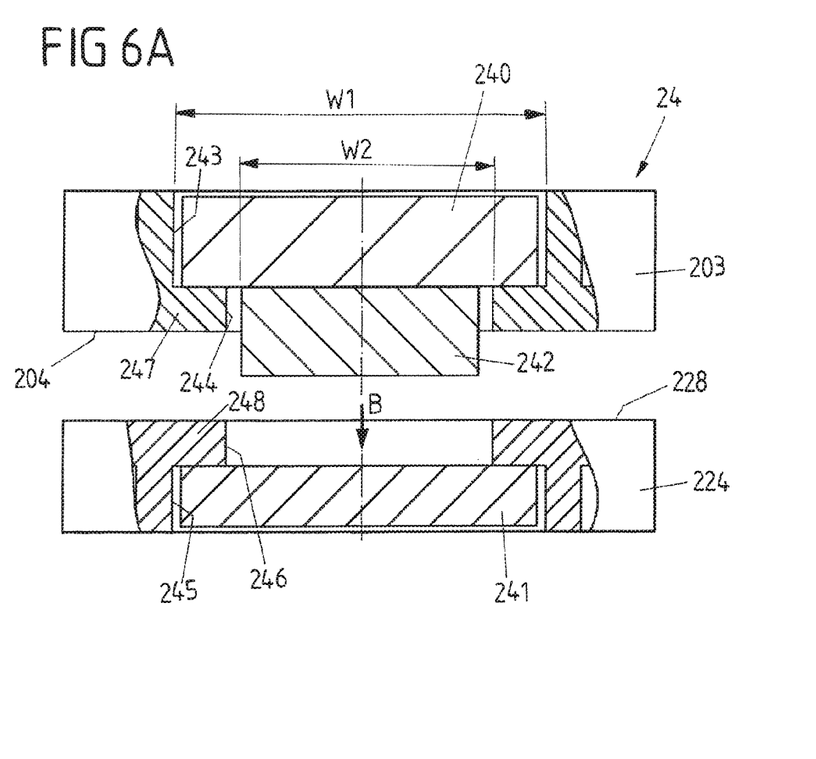
FIG. 6A is a partial sectional view of the arrangement according to FIG. 5 in the second, unlocking position.
Figure 6B:
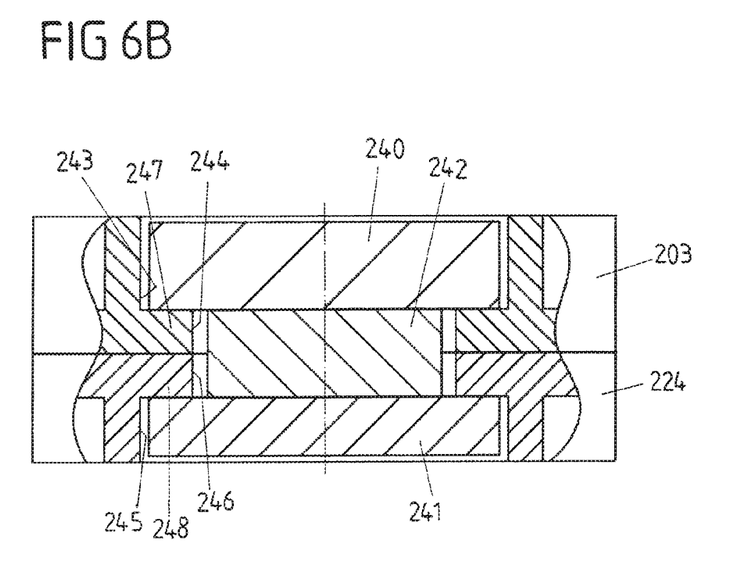
FIG. 6B is a partial sectional view of the arrangement according to FIG. 5 in the first, locking position.

FIG. 5 and FIG. 6A, 6B show an embodiment of a fixing device 24 in which a first fixing element 240 is arranged in a cylindrical receiving chamber 243 on the wall 203 of the housing part 20 and is held on an edge portion 247 in a form-fitting manner (see FIG. 6A). Similarly, a second fixing element 241 is arranged in a cylindrical receiving chamber 245 on the second lever arm 224 of the latching element 22 and held there in a form-fitting manner by means of an edge portion 248.

The edge portion 247 borders the receiving chamber 243 as far as a side 204 of the wall 203 that faces the latching element 22. Similarly, the edge portion 248 borders the receiving chamber 245 of the latching element 22 as far as a side 228 of the latching element 22, which faces the wall 203 of the housing part 20.

Because the cylindrical, disk-shaped fixing elements 240, 241 are each arranged in a receiving chamber 243, 245 of the associated component (wall 203 of the housing part 20 or latching element 22, respectively), said fixing elements are held in a form-fitting manner on the associated component. In this respect, the receiving chamber is bordered by an edge portion 247, 248 as far as the other component in each case, the edge portion 247, 248 each surrounding an opening 244, 246, which has a clearance W2 that is smaller than the clearance W1 of the associated receiving chamber 243, 245 (see FIG. 6A; reference is made to a direction transverse to the operating direction B).

While each of the fixing elements 240, 241 is held securely and reliably on the associated component thereof by the edge portion 247, 248, at the same time they are spaced apart from one another in the closed position, in other words in the first, locking position of the latching element 22 (see FIG. 6B) because the edge portions 247, 248 come to rest between the fixing elements 240, 241. Since the magnetic attraction forces between the fixing elements 240, 241 would decrease together with the spacing between the fixing elements 240, 241, a third fixing element 242 in the form of a magnet or a magnetic keeper is provided between the fixing elements 240, 241, which connects the fixing elements 240, 241 magnetically to one another and in particular, conducts a magnetic flux between the fixing elements 240, 241. The third fixing element 242 is inserted into the openings 244, 246, which are surrounded by the edge portions 247, 248, and, in the first, locking position (FIG. 6A), is located on both the first fixing element 240 and the second fixing element 241.

If the latching element 22 is operated to release the fixing device 24 in the operating direction B, then the second fixing element 241 is released from the third fixing element 242, the third fixing element 242 remaining adhered to the first fixing element 240 and therefore remaining immovable in the opening 244, attached to the first fixing element 240 (the third fixing element 242 adheres to the larger of the first fixing element 240 and the second fixing element 241 upon release of the fixing device 24, in this case the first fixing element 240).

By arranging each of the first fixing element 240 and the second fixing element 241 in an associated receiving chamber 243, 245, each fixing element 240, 241 is securely held on the associated component thereof, without the fixing element 240, 241 having to be fastened in a particular manner to the associated component. The third fixing element 242 does not have to be fastened separately to the first fixing element 240 either, it also being feasible, of course, to connect the third fixing element 242 to the first fixing element 240 additionally by sticking or screwing or in another mechanical manner.

The basic concept of the invention is not restricted to the embodiments described above but can also be implemented in completely different embodiments.

In particular, the present invention is not restricted to use on plug connector parts in the form of charging connectors, but can also be implemented in completely different, not necessarily electrical, connector parts.

The latching element is preferably designed as a latching lever, it also being feasible and possible, however, to design the latching element, for example, as a linear latching slide or similar.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Plug connector
2 Plug connector part
20 Housing part
200 Chamber
201 Wall
202 Bearing receiver
203 Wall
204 Side
21 Plug portion
210 Contact openings
22 Latching element
220 Latching portion
221 Bevel
222 Lever arm
223 Bearing element
224 Lever arm 226 Operating portion
227 Bracket
228 Side
23 Spring element
24 Fixing device
240-242 Fixing element (magnet)
243 Receiving chamber
244 Opening
245 Receiving chamber
246 Opening
247,248 Edge portion
3 Plug connector part
30 Housing
31 Plug receiver
32 Latch receiver
320 Recess
321 Edge portion
B Operating direction
E Insertion direction
S Closing direction
W1, W2 Clearance

The invention claimed is:

1. A plug connector part for a plug connector, comprising:
a housing part;
a plug portion which is arranged on the housing part and configured for plug-in connection to another plug connector part;
a latching element which is arranged in a movable manner on the housing part and has a latching portion configured to lock to the other plug connector part, the latching element being movable between a first, locking position for establishing locking between the plug connector part and the other plug connector part and a second, unlocking position for unlocking the plug connector part from the other plug connector part; and
a fixing device configured to fix the latching element in the first, locking position, the fixing device being configured to release a fixing provided by the fixing device in the first, locking position by an applying of a force to the latching element that is greater than a predetermined fixing force, and the latching element being movable in an operating direction toward the second, unlocking position after the fixing is released by an applying of a movement force that is less than the predetermined fixing force,
wherein the fixing device comprises a first fixing element, which is arranged on the housing part, and a second fixing element, which is arranged on the latching element, that interact with one another in the first, locking position of the latching element to provide the predetermined fixing force, and
wherein the first fixing element and the second fixing element are configured to be moved away from one another by operating the latching element to move toward the second, unlocking position.

2. The plug connector part according to claim 1, wherein the latching element comprises a latching lever, which is pivotally mounted on the housing part.

3. The plug connector part according to claim 1, wherein the latching element is pivotally mounted on the housing part by a bearing element and comprises a first lever arm that supports the latching portion and a second lever arm that is different from the first lever arm.

4. The plug connector part according to claim 3, wherein the fixing device is arranged on the second lever arm.

5. The plug connector part according to claim 3, wherein the latching element comprises an operating portion which is arranged on the second lever arm, the operating portion being configured to operate the latching element in order to move the latching element from the first, locking position into the second, unlocking position.

6. The plug connector part according to claim 1, wherein the latching element is preloaded toward the first, locking position.

7. The plug connector part according to claim 6, further comprising a spring element configured to provide pre-tensioning between the latching element and the housing part toward the first, locking position.

8. The plug connector part according to claim 1, wherein the first fixing element and the second fixing element are each magnetically acting elements that are located, in a magnetically attracting manner, opposite one another in the first, locking position.

9. The plug connector part according to claim 1, wherein the first fixing element is arranged in a receiving chamber of a wall of the housing part, the receiving chamber being bordered as far as a side of the wall of the housing part, which faces the latching element, by an edge portion against which the first fixing element is positioned.

10. The plug connector part according to claim 1, wherein the second fixing element is arranged in a receiving chamber of the latching element, the receiving chamber being bordered as far as a side of the latching element, which faces a wall of the housing part, by an edge portion against which the second fixing element is positioned.

11. The plug connector part according to claim 9, wherein the edge portion surrounds an opening that has a smaller width, when viewed in a direction transverse to the operating direction, than the receiving chamber.

12. The plug connector part according to claim 11, wherein a third fixing element in the form of a magnetically acting element is arranged on the first fixing element or on the second fixing element, the third fixing element being inserted in the opening, which is surrounded by the edge portion, in the wall of the housing part or of the latching element, and in the first, locking position is configured to act between the first fixing element and the second fixing element.

13. The plug connector part according to claim 12, wherein, in the first, locking position, the third fixing element is positioned against both the first fixing element and the second fixing element.

14. The plug connector part according to claim 10, wherein the edge portion surrounds an opening that has a smaller width, when viewed in a direction transverse to the operating direction, than the receiving chamber.

15. The plug connector part according to claim 14, wherein a third fixing element in the form of a magnetically acting element is arranged on the first fixing element or on the second fixing element, the third fixing element being inserted in the opening, which is surrounded by the edge portion, in the wall of the housing part or of the latching element, and in the first, locking position is configured to act between the first fixing element and the second fixing element.

16. The plug connector part according to claim 15, wherein, in the first, locking position, the third fixing element is positioned against both the first fixing element and the second fixing element.

17. A plug connector part for a plug connector, comprising:
a housing part;

a plug portion which is arranged on the housing part and configured for plug-in connection to another plug connector part;

a latching element which is arranged in a movable manner on the housing part and has a latching portion configured to lock to the other plug connector part, the latching element being movable between a first, locking position for establishing locking between the plug connector part and the other plug connector part and a second, unlocking position for unlocking the plug connector part from the other plug connector part; and a fixing device configured to fix the latching element in the first, locking position, the fixing device being configured to release a fixing provided by the fixing device in the first, locking position by an applying of a force to the latching element that is greater than a predetermined fixing force, and the latching element being movable in an operating direction toward the second, unlocking position after the fixing is released by an applying of a movement force that is less than the predetermined fixing force, wherein the fixing device comprises a first fixing element, which is arranged on the housing part, and a second fixing element, which is arranged on the latching element, that interact with one another in the first, locking position of the latching element to provide the predetermined fixing force, and wherein the first fixing element and the second fixing element are each magnetically acting elements that are located, in a magnetically attracting manner, opposite one another in the first, locking position.

18. A plug connector part for a plug connector, comprising:

a housing part;

a plug portion which is arranged on the housing part and configured for plug-in connection to another plug connector part;

a latching element which is arranged in a movable manner on the housing part and has a latching portion configured to lock to the other plug connector part, the latching element being movable between a first, locking position for establishing locking between the plug connector part and the other plug connector part and a second, unlocking position for unlocking the plug connector part from the other plug connector part; and a fixing device configured to fix the latching element in the first, locking position, the fixing device being configured to release a fixing provided by the fixing device in the first, locking position by an applying of a force to the latching element that is greater than a predetermined fixing force, and the latching element being movable in an operating direction toward the second, unlocking position after the fixing is released by an applying of a movement force that is less than the predetermined fixing force, wherein the fixing device comprises a first fixing element, which is arranged on the housing part, and a second fixing element, which is arranged on the latching element, that interact with one another in the first, locking position of the latching element to provide the predetermined fixing force, and wherein the first fixing element is arranged in a receiving chamber of a wall of the housing part, the receiving chamber being bordered as far as a side of the wall of the housing part, which faces the latching element, by an edge portion against which the first fixing element is positioned.

* * * * *